(12) United States Patent
Takashima et al.

(10) Patent No.: US 10,495,115 B2
(45) Date of Patent: Dec. 3, 2019

(54) PORTABLE POWER WORKING MACHINE

(71) Applicant: YAMABIKO CORPORATION, Ohme-shi, Tokyo (JP)

(72) Inventors: Masahiko Takashima, Tokyo (JP); Yusuke Kinoshita, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 232 days.

(21) Appl. No.: 15/393,873

(22) Filed: Dec. 29, 2016

(65) Prior Publication Data

US 2017/0241443 A1    Aug. 24, 2017

(30) Foreign Application Priority Data

Feb. 23, 2016    (JP) ................................ 2016-032032

(51) Int. Cl.
| | |
|---|---|
| *F04D 29/70* | (2006.01) |
| *F04D 17/08* | (2006.01) |
| *F04D 25/08* | (2006.01) |
| *F04D 29/28* | (2006.01) |
| *F04D 29/42* | (2006.01) |
| *E01H 1/08* | (2006.01) |

(52) U.S. Cl.
CPC ......... *F04D 29/703* (2013.01); *E01H 1/0809* (2013.01); *F04D 17/08* (2013.01); *F04D 25/08* (2013.01); *F04D 29/281* (2013.01); *F04D 29/4226* (2013.01)

(58) Field of Classification Search
CPC ...... A47L 5/14; A47L 2501/12; F04D 29/703; F04D 29/4213; F04D 29/424; F16K 3/029

USPC ................... 415/119, 108, 121.2; 417/423.9; 416/247 R; 15/318, 317, 405, 330
See application file for complete search history.

(56) References Cited

U.S. PATENT DOCUMENTS

| | | | |
|---|---|---|---|
| 585,188 A | * | 6/1897 | Davis ..................... B01D 45/14 |
| | | | 55/400 |
| 4,403,371 A | | 9/1983 | Kiyooka |
| 4,756,668 A | * | 7/1988 | Gassen ................. F04D 29/703 |
| | | | 15/405 |

(Continued)

FOREIGN PATENT DOCUMENTS

| | | |
|---|---|---|
| EP | 2 050 969 A1 | 4/2009 |
| JP | S56-156496 A | 12/1981 |

OTHER PUBLICATIONS

Extended Search Report in corresponding European Application No. 17156913.0, dated Jul. 11, 2017, 4 pages.

*Primary Examiner* — Kenneth Bomberg
*Assistant Examiner* — Andrew Thanh Bui
(74) *Attorney, Agent, or Firm* — Brinks Gilson & Lione

(57) ABSTRACT

The invention is directed to a portable power working machine in which a casing has a side surface in which a suction port is provided. A block prevention guard is attached to the side surface of the casing. The block prevention guard comprises a top surface opening formed in the block prevention guard to at least partially overlap the suction port. The block prevention guard further comprises a plurality of legs standing from the side surface of the casing to maintain the top surface opening at a distance from the side surface. In addition to the top surface surface, an air flow window is formed between two adjacent legs in the circumferential direction of the top surface opening.

6 Claims, 12 Drawing Sheets

(56) References Cited

U.S. PATENT DOCUMENTS

| | | | |
|---|---|---|---|
| 7,393,272 B2 * | 7/2008 | Sundet | F24F 13/28 416/247 R |
| 7,758,196 B1 * | 7/2010 | He | F21V 33/0096 362/253 |
| 2004/0172928 A1 * | 9/2004 | Kubokawa | B01D 46/0005 55/497 |
| 2006/0153674 A1 * | 7/2006 | Kamoshita | F04D 25/02 415/119 |
| 2008/0184523 A1 * | 8/2008 | Yuasa | F04D 29/703 15/412 |

* cited by examiner

PORTABLE POWER WORKING MACHINE

CLAIM OF PRIORITY

The present application claims priority from Japanese patent application JP 2016-032032 filed on Feb. 23, 2016, the content of which is hereby incorporated by reference into this application.

BACKGROUND

Technical Field

The present invention relates to a portable power working machine of a hand-held type, a shouldering strap type, or another type, and for example, to a portable power working machine, such as an air blowing cleaner that performs cleaning by collecting fallen leaves and rubbishes or a power sprayer that sprays chemicals or the like with the use of air (blown air) discharged from an air blower that is rotationally driven by a driving power source such as an engine or an electric motor.

Background Art

A hand-held air blowing cleaner (power blower) 2 that is one type of the aforementioned portable power working machine, as its conventional example is shown in FIGS. 8A and 8B (see also Patent Document 1), is configured such that a centrifugal air blower 15 with a built-in fan is disposed on one side of a body portion 10 made of a synthetic resin, an engine 50 or the like that is a driving power source is disposed on the other side of the body portion 10, an air blowing pipe 55 is connected to an outlet of a fan case (volute case) 20 of the air blower 15, and stands 14 for holding an air blowing cleaner 2 in an upright posture are provided on the lower front and rear sides of the body portion 10. The operator commonly performs cleaning by holding a handle 12 provided on the body portion 10 with one hand (normally the right hand).

A suction port 25 with a circular opening for intake air is provided in the vicinity of the center of one side surface portion (left side surface portion) 20L of the fan case 20 of the air blower 15 such that its center is positioned on the rotational axis of the fan, and a safety guard 60 in a basket shape is provided on the side surface portion 20L of the fan case 20 so as to cover the suction port 25.

The safety guard 60 is designed to prevent fingers from being caught in the suction port 25, for example, and also prevent floating objects such as fallen leaves blown up in the air from being sucked into the suction port 25, and includes a top surface portion 61 on which a circular opening 63 similar to the circular opening of the suction port 25 is provided and a peripheral side portion 62 in a truncated cone shape for allowing the top surface portion 61 (the circular opening 63 thereof) to face the suction port 25 with a predetermined distance therebetween. The circular opening 63 of the top surface portion 61 and the peripheral side portion 62 are provided with lattices 66 and 67, respectively, each of which has a predetermined geometric pattern.

In the air blowing cleaner 2 configured in the aforementioned manner, when the fan of the air blower 15 is rotationally driven by the engine 50, the external air passes through each of the apertures of the lattices 66 and 67 of the safety guard 60 so as to be sucked from the suction port 25 into the fan case 20. The sucked air is pressurized and accelerated inside the fan case 20 and blown out via the air blowing pipe 55 that is connected to a discharge port provided on the upper front side of the fan case 20, and the air (blown air) blown out is used for collecting fallen leaves and rubbishes to perform cleaning work.

RELATED ART DOCUMENTS

Patent Documents

Patent Document 1: JP S56-156496 A

SUMMARY

However, in such a conventional air blowing cleaner (hereinafter simply referred to as a working machine) 2, since the safety guard 60 is positioned on the operator side during operation of the cleaner, the operator's clothing is occasionally sucked to the safety guard 60 due to the suction force of the air blower 15, which can partially block the safety guard 60.

When the safety guard 60 is partially blocked by the operator's clothing sucked thereto, the area for an air blow is reduced, which can cause a rapid increase in the engine speed leading to greater vibration and louder noise and also cause a reduction in the amount of the blown air. Further, this provides the operator with an unpleasant feeling and also makes it difficult to handle the working machine 2, and as a result, the operation efficiency is lowered.

Thus, in the conventional working machine 2, in order to alleviate the suction of the clothing to the safety guard 60, the top surface portion 61 (the circular opening 63 thereof) of the safety guard 60 is disposed widely apart from the suction port 25, that is, the height of the peripheral side portion 62 of the safety guard 60 is increased, thereby weakening the force of sucking the clothing to the safety guard 60 due to the suction force of the air blower 15 and thus suppressing the influence of the suction force of the air blower 15.

However, when the height of the peripheral side portion 62 is increased in this manner, as shown in FIG. 8B, the amount H of a portion that protrudes from the side surface portion 20L of the fan case 20 to the lateral side of the safety guard 60 is increased, which causes increases in size and weight as well as deterioration of the operability of the working machine.

Meanwhile, as another measure for preventing the clothing from being sucked, Patent Document 1 suggests a portable power working machine in which a body portion has attached thereto a cap-like cover with a U-shaped cross section that has a top surface portion and a peripheral side portion such that the cap-like cover entirely covers one side surface portion of the fan case with the suction port, and a side suction port that is different from the suction port (main suction port) is provided on the peripheral side portion of the cap-like cover so that the external air is inhaled into the main suction port from the side suction port through the space between the side surface portion of the fan case and the top surface portion of the cap-like cover, that is, the external air is inhaled laterally (radially) from the main suction port.

By configuring the working machine such that the cap-like cover is provided to guide the external air from the side suction port to the main suction port, as in the aforementioned manner, the suction of the worker's clothing to the top surface portion can be suppressed. It should be noted that in the portable power working machine suggested above, neither the main suction port nor the side suction port is provided with a lattice (safety guard) (the cap-like cover functions as a safety guard).

However, in the conventional portable power working machine described in Patent Document 1, the top surface portion of the cap-like cover on which the suction force of the fan acts to a relatively great extent and that faces the main suction port is not provided with an opening, and the external air passes through the side suction port with a relatively small opening area and further through the space between one side surface portion of the fan case and the top surface portion of the cap-like cover so as to be inhaled laterally (radially) from the main suction port. In such a working machine, the channel for taking the air into the fan case via the main suction port is bent, which increases the inhalation resistance, making it difficult to sufficiently utilize the suction force of the fan and which also blocks the front portion (top surface portion) where the suction force is strong, thereby lowering the inhalation efficiency. Thus, there is a problem that a required air blowing performance is difficult to obtain.

The present invention has been made in view of the aforementioned circumstances, and an object of the present invention is to provide a portable power working machine in which suction of clothing to the safety guard can be reliably prevented and the amount of a portion that protrudes laterally from one side surface portion of the fan case can be reduced so as to enable a required air blowing performance to be obtained without causing an increase in size or weight, deterioration of the operability thereof, or the like.

With a view to realizing the aforementioned object, the portable power working machine according to the present invention is basically configured such that it includes an air blower and a driving power source for rotationally driving a fan of the air blower, the air blower and the driving power source being disposed on a body portion with a handle; a suction port for intake air, the suction port being provided on one side surface portion of the a fan case of the air blower; a safety guard provided in the suction port, the safety guard having a lattice with a predetermined geometric pattern. The one side surface portion of the fan case has attached thereto a block prevention guard, the block prevention guard having a top surface opening that at least partially faces the suction port, and a lattice with a predetermined geometric pattern provided in the top surface opening. The average opening area of apertures of the lattice provided in the top surface opening of the block prevention guard is larger than the average opening area of apertures of the lattice of the safety guard.

The block prevention guard preferably has a top surface portion provided with the top surface opening, and a plurality of leg portions for allowing the top surface opening to face the suction port with a predetermined distance therebetween.

In a preferred aspect, peripheral surface openings are each formed between adjacent leg portions of the plurality of leg portions, each of the peripheral surface openings being wider than each of the plurality of leg portions.

In another preferred aspect, the total opening area obtained by adding the opening area of the lattice provided in the top surface opening to the opening areas of the peripheral surface openings each formed between the adjacent leg portions is larger than the opening area of the lattice of the safety guard.

In yet another preferred aspect, each of the suction port and the top surface opening has a circular shape, and the centers of the suction port and the top surface opening are positioned on the rotational axis of the fan.

In still another preferred aspect, a rib portion that forms the lattice of the top surface opening and a rib portion that forms the lattice of the safety guard are configured to partially overlap with each other as seen in a side view.

In the portable power working machine according to the present invention, when the block prevention guard is positioned on the operator side during the operation of the working machine, the operator's clothing can be prevented from being sucked to the safety guard. Even when the operator's clothing is sucked to the block prevention guard, since the average opening area of the apertures of the lattice provided in the top surface opening of the block prevention guard is set to be far larger than that of the apertures of the lattice of the safety guard, the operator's clothing can be prevented from being stuck to the surface of the block prevention guard, and thus the suction of the clothing to the safety guard is reliably prevented and a sufficient area (space) for intake air is secured on the periphery of the safety guard.

Further, even when the block prevention guard is partially blocked by the clothing sucked thereto, a sufficient area for an air blow can be secured with a portion of the opening unblocked (the amount of the remaining portion of the opening when the block prevention guard is partially blocked) because the intake amount of air depends on the opening area of the safety guard (the lattice portion thereof), and relatively large peripheral surface openings are each formed between the adjacent leg portions of the block prevention guard, and further, the total opening area of the block prevention guard obtained by adding the opening area of the lattice of the top surface opening to the opening areas of the peripheral surface openings is set to be larger than the opening area of the safety guard (the lattice portion thereof).

Therefore, even when the block prevention guard is partially blocked by the clothing sucked thereto, the intake amount of air is not reduced and the fluctuation of the engine speed is thus suppressed, and also the force of sucking the clothing is weakened to thereby suppress the operator's unpleasant feeling. As a result, the amplification of vibration and noise, the reduction in the amount of the blown air, the deterioration of the operability and the operation efficiency, and the like that were generated in the conventional example, can be effectively suppressed.

Furthermore, since the opening area of the lattice portion of the top surface opening and the opening areas of the peripheral surface openings of the block prevention guard are set to be considerably large as described above, the amount of the portion of the block prevention guard that protrudes laterally from the one side surface portion of the fan case can be reduced as compared to the amount of the protruding portion of the safety guard in the conventional example, thereby enabling a required air blowing performance to be obtained without causing an increase in size or weight, deterioration of the operability of the working machine, or the like.

BRIEF DESCRIPTION OF THE DRAWINGS

FIG. 6A is an enlarged exploded plan view, and FIG. 6B is an enlarged plan view.

FIG. 7A is an enlarged exploded rear view, and FIG. 7B is an enlarged rear view.

FIG. 8A is a perspective view seen obliquely from above and a left front side, and FIG. 8B is a rear view.

DETAILED DESCRIPTION OF THE PREFERRED EMBODIMENTS

Figure 1:
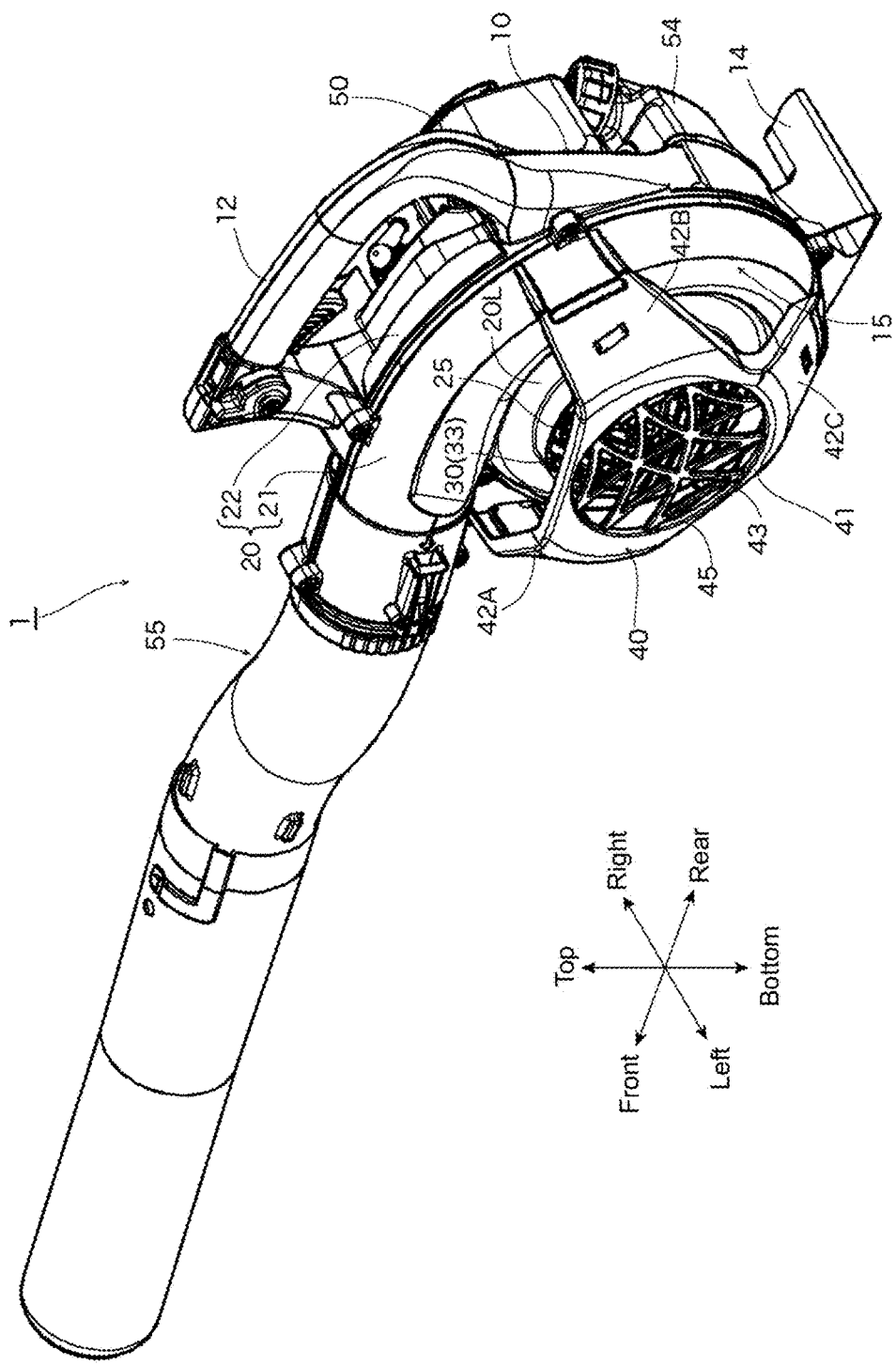
FIG. 1 is an overall perspective view of an embodiment of a portable power working machine according to the present invention seen obliquely from above and a left rear side.

Hereafter, an embodiment of the present invention will be described referring to the drawings.

Figure 2:
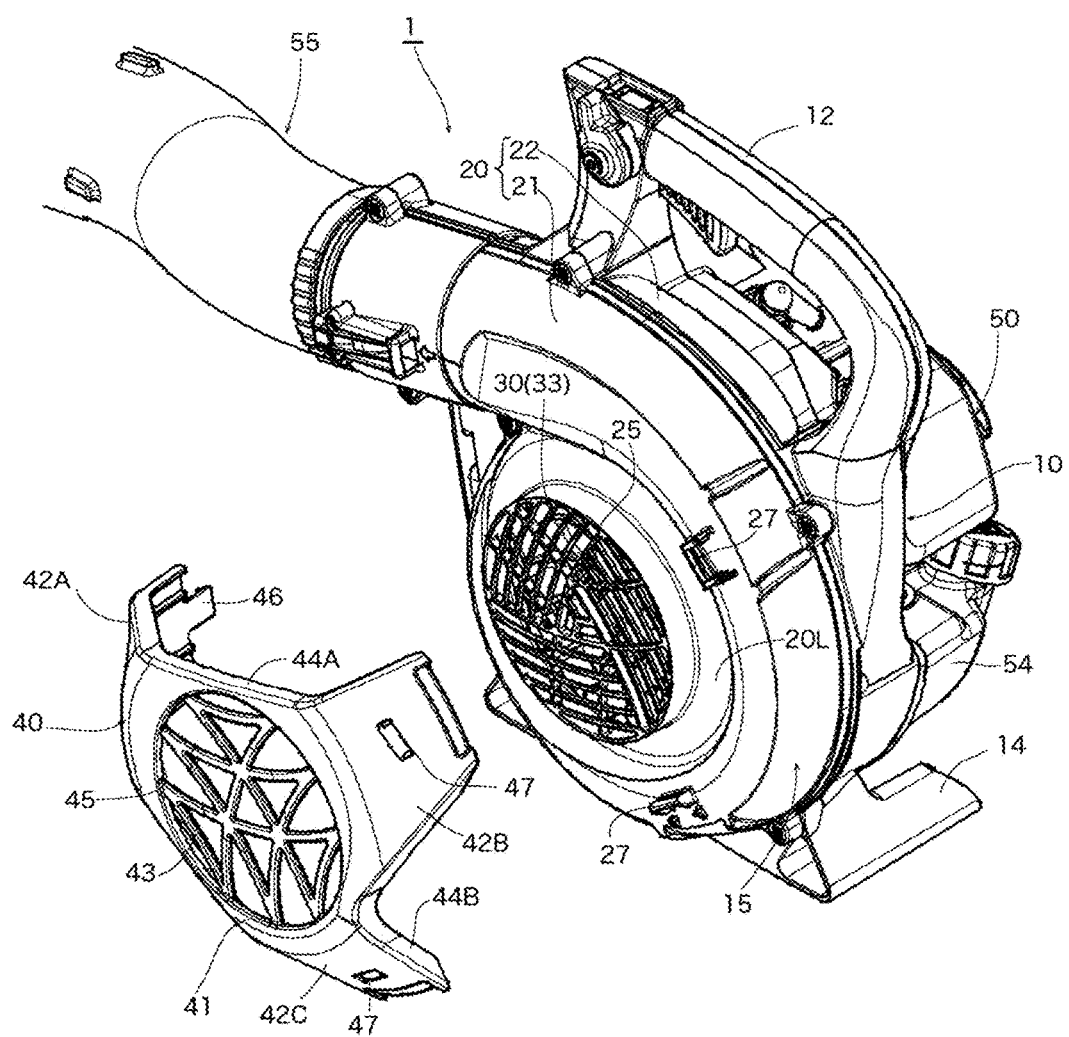
FIG. 2 is an enlarged exploded perspective view of a main portion of the portable power working machine shown in FIG. 1.
Figure 3:
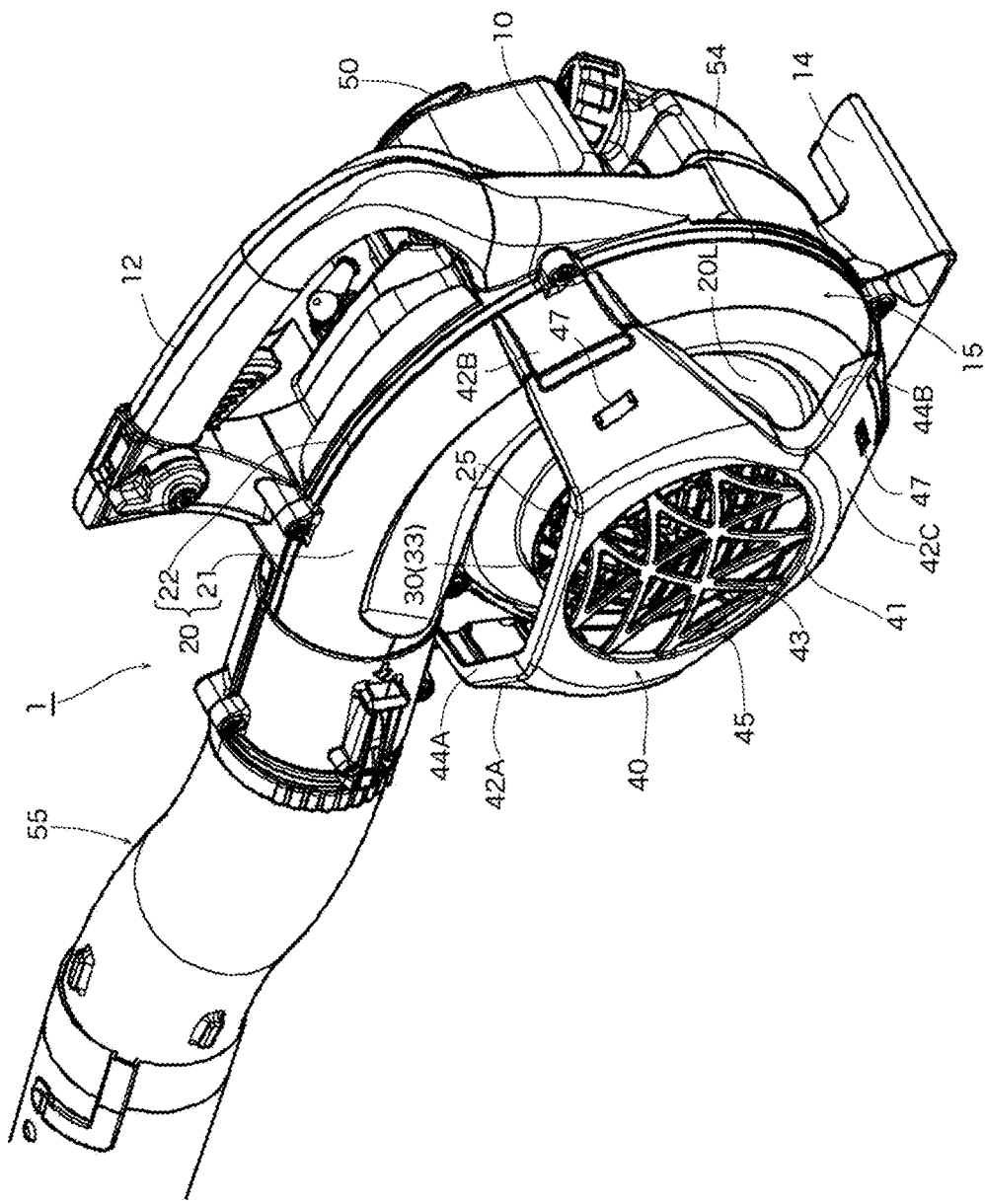
FIG. 3 is an enlarged perspective view of the main portion of the portable power working machine shown in FIG. 1.
Figure 4:
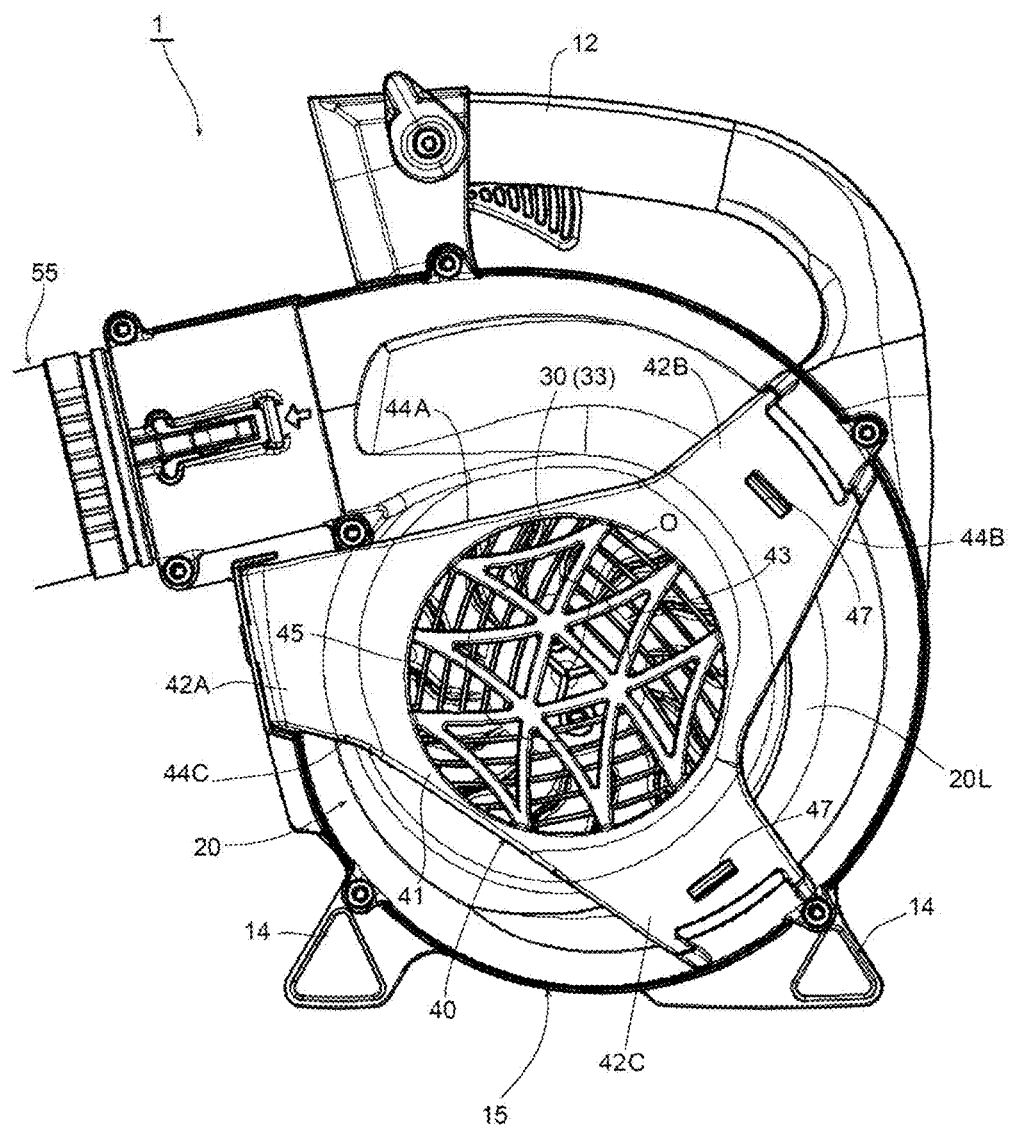
FIG. 4 is an enlarged left side view of the main portion of the portable power working machine shown in FIG. 1.

FIG. 1 is an overall perspective view of an embodiment of a portable power working machine according to the present invention seen obliquely from above and a left rear side, and FIGS. 2, 3, and 4 are an enlarged exploded perspective view, an enlarged perspective view, and an enlarged left side view of a main portion of the portable power working machine according to the present invention, respectively. It should be noted that in each of the drawings, parts that correspond to those of the aforementioned air blowing cleaner 2 shown as a conventional example in FIGS. 8A and 8B are each denoted with the same symbols as those for the corresponding parts of the aforementioned air blowing cleaner 2.

Further, in the present specification, a side on which a handle is provided is the upper side and a side to which an air blowing pipe is connected is the front side (see the directional arrows in FIG. 1).

Figure 8A:
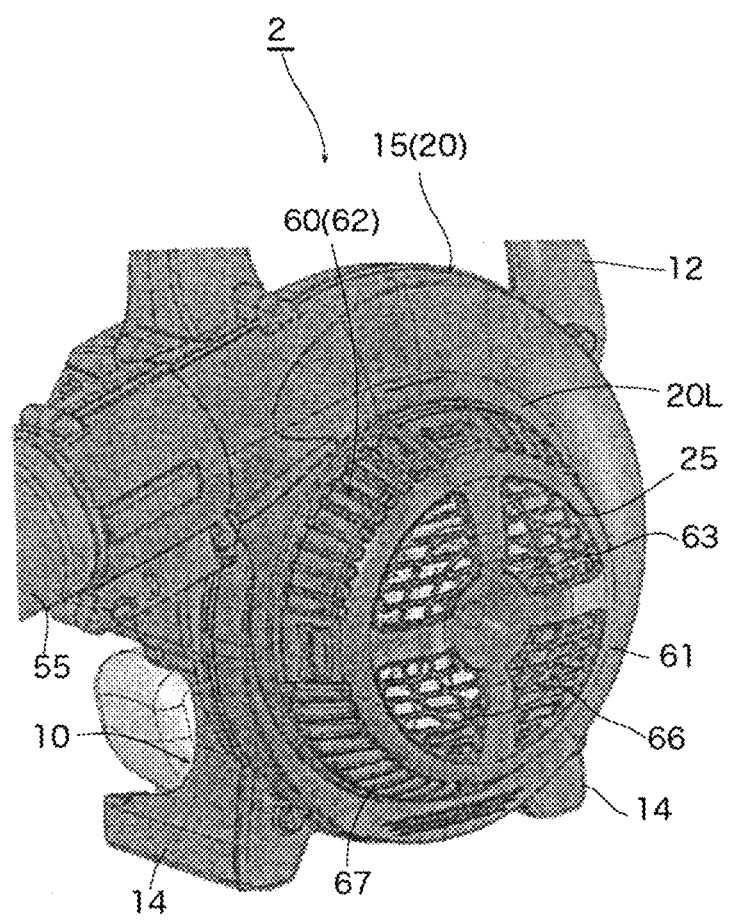
FIGS. 8A and 8B show a main portion of a hand-held air blowing cleaner, as a conventional example, that is one type of the portable power working machine.
Figure 8B:
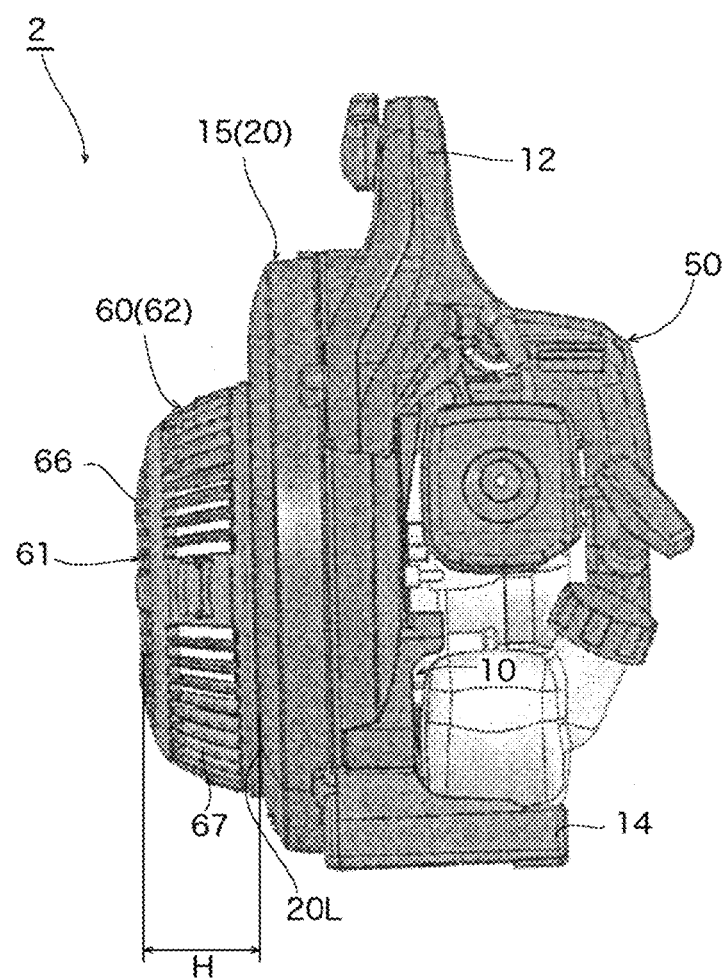

Similarly to the hand-held air blowing cleaner 2 shown as the conventional example in FIGS. 8A and 8B, a portable power working machine 1 of the present embodiment is configured such that a handle 12 provided on a body portion 10 made of a synthetic resin is held, for example, with a right hand for cleaning work; a centrifugal air blower 15 with a built-in fan is disposed on the left side (on the operator side when the machine is operated) of the body portion 10; and an engine 50 (small air-cooled two-stroke gasoline engine) that is a driving power source, a fuel tank 54, and the like are disposed on the right side of the body portion 10.

A fan case (volute case) 20 of the air blower 15 has a two-part structure that includes a right side case portion 22 provided on the body portion 10 and a left side case portion 21 securely screwed, with a bolt or the like, to the right side case portion 22, and an air blowing pipe 55 is connected to a discharge port provided on the upper front portion of the fan case 20. Stands 14 for holding the working machine 1 in an upright posture are provided on the lower portion of the body portion 10.

Figure 5A:
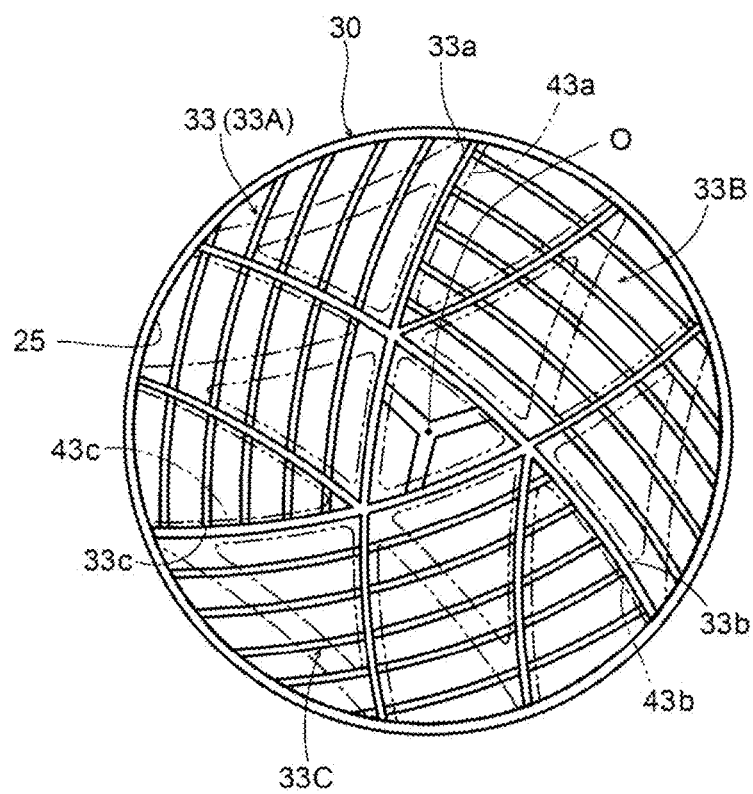
FIG. 5A is an enlarged left side view showing a suction port and a safety guard of the portable power working machine shown in FIG. 1 in a state in which a block prevention guard is removed and FIG. 5B is an enlarged left side view showing a top surface opening and the periphery of a top surface portion of the block prevention guard of the portable power working machine shown in FIG. 1.
Figure 5B:
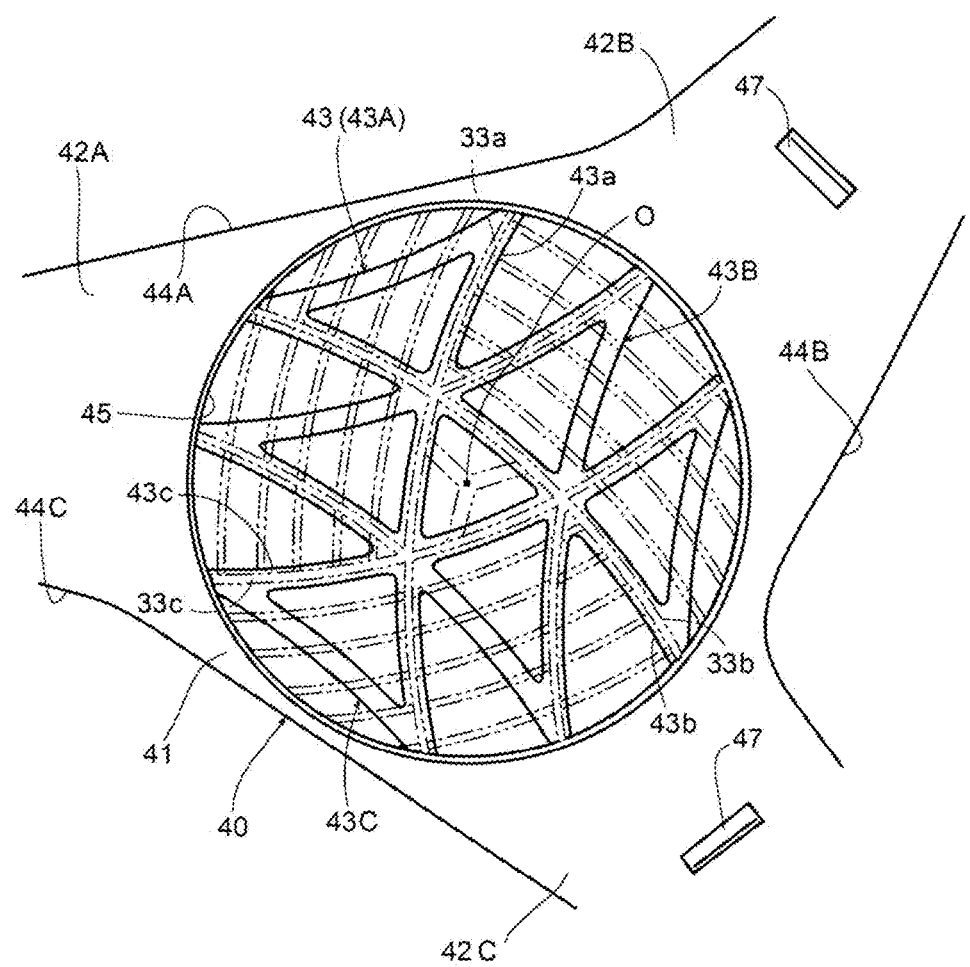

As can be clearly seen with reference to FIG. 5A in addition to FIGS. 1 to 4, a suction port 25 with a circular opening for inhaling air is provided in the vicinity of the center of the one side surface portion (left side surface portion) 20L of the fan case 20 of the air blower 15 such that its center is positioned on the rotational axis O of the fan, and the suction port 25 is provided with a safety guard 30 having a lattice 33 with a predetermined geometric pattern.

Unlike the safety guard 60 in a basket shape in the conventional example, the safety guard 30 of this example has only the lattice 33 that is formed on a flat plane or a slightly curved plane with a single plane (in the suction port 25), and the safety guard 30 (lattice 33) is integrally formed with, for example, the fan case 20 (the left side case portion 21 thereof). The lattice 33 portion has a predetermined number of arc ribs including the three longest main arc ribs 33a, 33b, and 33c, by which the lattice 33 portion is partitioned into three regions 33A, 33B, and 33C in the same shape and size that have a predetermined number of relatively small, substantially rectangular apertures (see FIG. 5A).

Meanwhile, a block prevention guard 40 is attached to the left side surface portion 20L of the fan case 20 for preventing the clothing from being sucked to the safety guard 30 to secure a required area for the air blow. This block prevention guard 40 has a top surface portion 41 provided with a top surface opening 45 with a diameter substantially equal to that of the suction port 25 and three leg portions 42A, 42B, and 42C for allowing the top surface opening 45 of the top surface portion 41 to face the suction port 25 with a predetermined distance therebetween. The top surface opening 45 is positioned such that its center is positioned on the rotational axis O of the fan as with the suction port 25, and the top surface opening 45 is provided with a lattice 43 with a predetermined geometric pattern (the detail will be described later).

It should be noted that in this example, the top surface opening 45 of the top surface portion 41 has the diameter substantially equal to that of the suction port 25 and is provided so as to entirely face the suction port 25, but the top surface opening 45 may be provided so as to partially cover the suction port 25 (for example, a portion where the force of sucking the clothing is strong).

The three leg portions 42A, 42B, and 42C are formed substantially equidistantly from one another, each of which has a cross section in an L or chevron shape. In addition, peripheral surface openings 44A, 44B, and 44C, each of which is relatively large, has a substantially mountain-like shape, and is wider than each of the leg portions 42A, 42B, and 42C, are formed between the leg portions 42A and 42B, between the leg portions 42B and 42C, and between the leg portions 42C and 42A, respectively.

Further, of the three leg portions 42A, 42B, and 42C, the leg portion 42A positioned on the left side as seen in the left side view is provided with a latching claw 46 at the bottom thereof, and the latching claw 46 is adapted to be inserted into and locked to a locking portion (not shown) provided on the fan case 20. Of the three leg portions 42A, 42B, and 42C, the leg portions 42B and 42C positioned on the upper right and lower right, respectively, as seen in the left side view, are each provided with a latch window 47 to which a locking claw 27 that projects from the fan case 20 is fitted and locked.

Furthermore, the lattice 43 portion provided in the top surface opening 45 has a predetermined number of arc ribs including the three longest main arc ribs 43a, 43b, and 43c (which are slightly wider than the main arc ribs 33a, 33b, and 33c that form the lattice 33 of the safety guard 30), by which the lattice 43 portion is partitioned into three regions 43A, 43B, and 43C in the same shape and size that have a predetermined number of relatively large, substantially triangular apertures, and the areas of the three regions 43A, 43B, and 43C are substantially equal to those of the three regions 33A, 33B, and 33C of the safety guard 30, respectively. Moreover, the three longest main arc ribs 43a, 43b, and 43c of the lattice 43 portion provided in the top surface opening 45 are disposed so as to overlap the three longest main arc ribs 33a, 33b, and 33c of the lattice 33 portion of the safety guard 30, respectively, as seen in the left side view. Accordingly, the three regions 43A, 43B, and 43C are adapted to face directly the three regions 33A, 33B, and 33C of the safety guard 30, respectively.

Further, the number of arc ribs that form the lattice 43 of the top surface opening 45 of the block prevention guard 40 is set to be smaller than that of the arc ribs that form the lattice 33 of the safety guard 30 (the suction port 25), and each of the intervals between the arc ribs that form the lattice 43 of the top surface opening 45 of the block prevention guard 40 is set to be larger than each of the intervals between the arc ribs that form the lattice 33 of the safety guard 30 (the suction port 25), and further, the average opening area of the apertures (in a substantially triangular shape) of the lattice 43 provided in the top surface opening 45 is set to be far larger than that of the apertures (in a substantially rectangular shape) of the lattice 33 of the safety guard 30.

In this example, the opening area of the lattice 33 of the safety guard 30 is approximately 7,900 mm² and the average opening area of the apertures of the lattice 33 of the safety guard 30 is approximately 150 mm², while the opening area of the lattice 43 of the top surface opening 45 of the block prevention guard 40 is approximately 7,400 mm² and the average opening area of the apertures of the lattice 43 of the top surface opening 45 of the block prevention guard 40 is approximately 460 mm². Further, the opening areas of the peripheral surface openings 44A, 44B, and 44C of the block prevention guard 40 are approximately 6,600 mm², approximately 2,300 mm², and approximately 4,700 mm², respectively, and the total opening area of the block prevention guard 40 (the area obtained by adding the opening area of the lattice 43 of the top surface opening 45 to the opening areas of the peripheral surface openings 44A, 44B, and 44C) is approximately 21,000 mm². That is, the average opening area of the apertures of the lattice 43 provided in the top surface opening 45 of the block prevention guard 40 is set to be three times or more that of the apertures of the lattice 33 of the safety guard 30, and the total opening area of the block prevention guard 40 is set to be twice or more the opening area of the lattice of the safety guard 30 (the total opening area of the safety guard 30).

In the working machine 1 of the present embodiment configured in the aforementioned manner, when the fan of the air blower 15 is rotationally driven by the engine 50, the external air passes through the apertures of the lattice 43 of the top surface opening 45 and the peripheral surface openings 44A, 44B, and 44C of the block prevention guard 40 and further through the apertures of the lattice 33 of the safety guard 30 so as to be sucked from the suction port 25 into the fan case 20. The sucked air is pressurized and accelerated inside the fan case 20 and blown out forward via the air blowing pipe 55 that is connected to the discharge port provided on the upper front portion of the fan case 20, and the air (blown air) blown out is used for collecting fallen leaves and rubbishes to perform cleaning work.

When the block prevention guard 40 is positioned on the operator side during the operation of the working machine, the operator's clothing can be prevented from being sucked to the safety guard 30. Even when the operator's clothing is sucked to the block prevention guard 40, since the average opening area of the apertures of the lattice 43 provided in the top surface opening 45 of the block prevention guard 40 is set to be far larger than that of the apertures of the lattice 33 of the safety guard 30, the operator's clothing can be prevented from being stuck to the surface of the block prevention guard 40, and thus the suction of the clothing to the safety guard 30 is reliably prevented and a sufficient area (space) for intake air is secured on the periphery of the safety guard 30.

Further, even when the block prevention guard 40 is partially blocked by the clothing sucked thereto, a sufficient area for the air blow can be secured with a portion of the opening unblocked (the amount of the remaining portion of the opening when the block prevention guard 40 is partially blocked) because the intake amount of air depends on the opening area of the safety guard 30 (the lattice 33 portion thereof), and relatively large peripheral surface openings 44A, 44B, and 44C each having a substantially mountain-like shape are formed between the leg portions 42A and 42B, between the leg portions 42B and 42C, and between the leg portions 42C and 42A of the three leg portions, respectively, and further, the total opening area of the block prevention guard 40 obtained by adding the opening area of the lattice 43 of the top surface opening 45 to the opening areas of the peripheral surface openings 44A, 44B, and 44C is set to be larger than the opening area of the safety guard 30 (the lattice 33 portion thereof).

Therefore, even when the block prevention guard 40 is partially blocked by the clothing sucked thereto, the intake amount of air is not reduced and the fluctuation of the engine speed is thus suppressed, and also the force of sucking the clothing is weakened to thereby suppress the operator's unpleasant feeling. As a result, the amplification of vibration and noise, the reduction in the amount of the blown air, the deterioration of the operability and the operation efficiency, and the like that were generated in the conventional example, can be effectively suppressed.

Figure 6A:
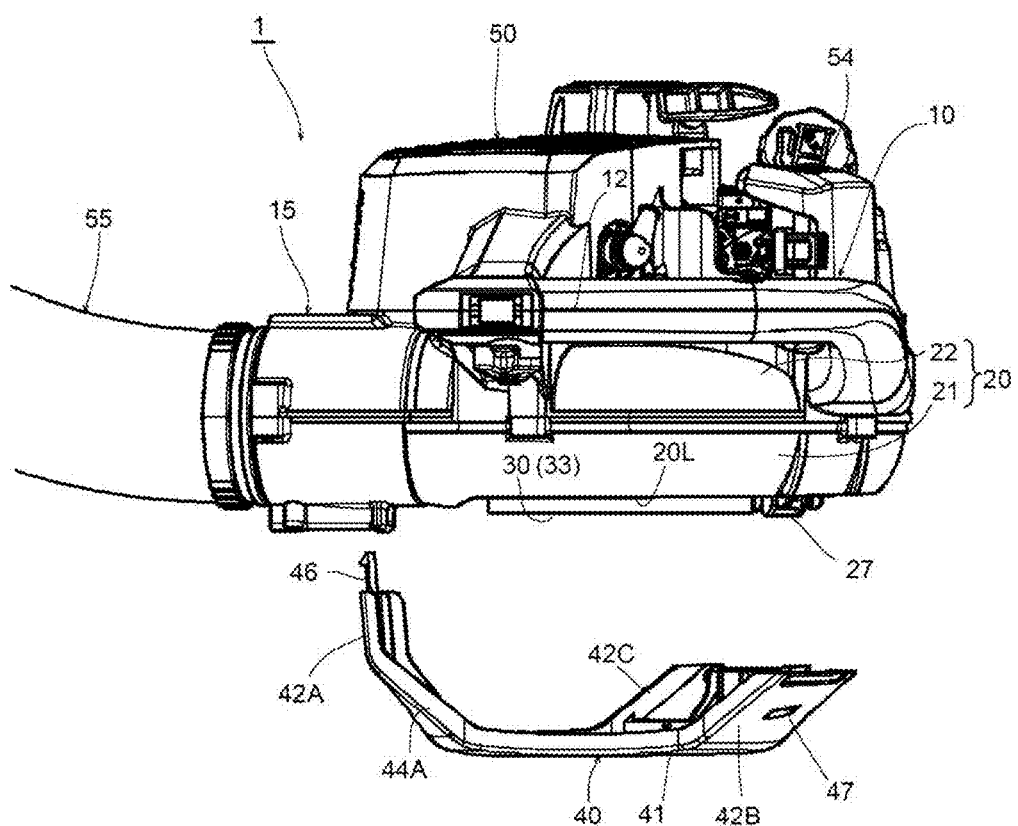
FIGS. 6A and 6B show the main portion of the portable power working machine shown in FIG. 1.
Figure 6B:
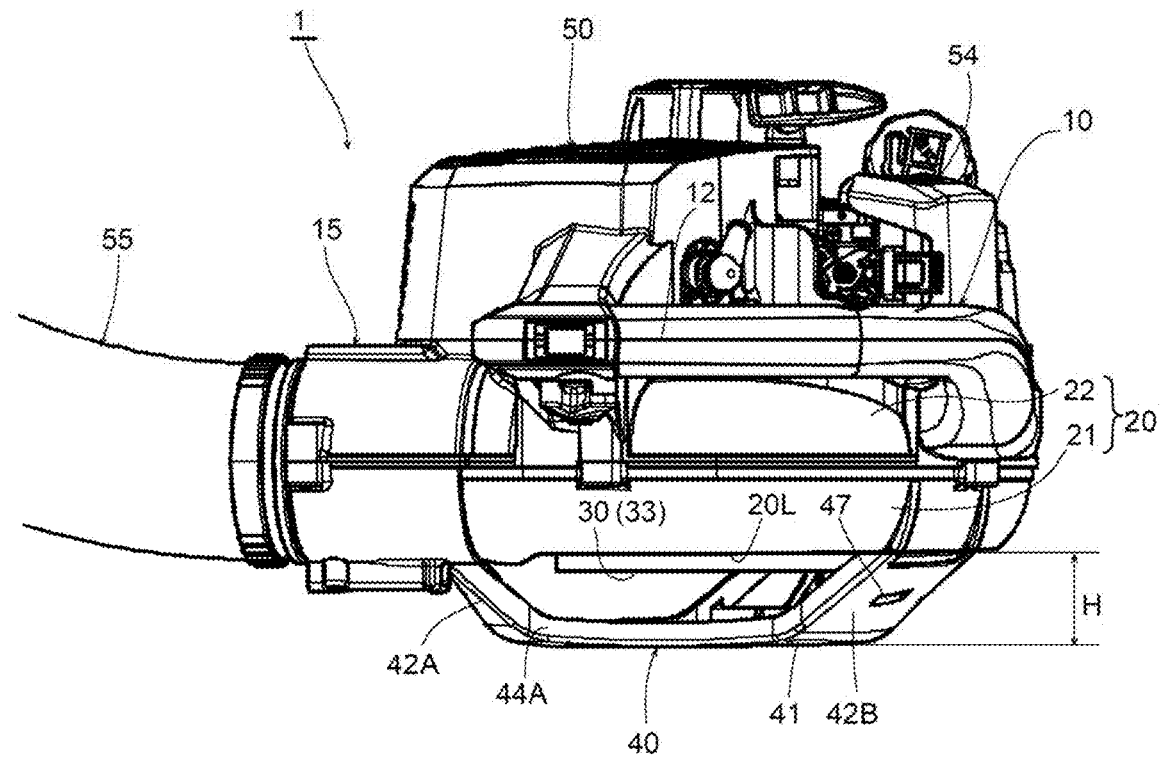
Figure 7A:
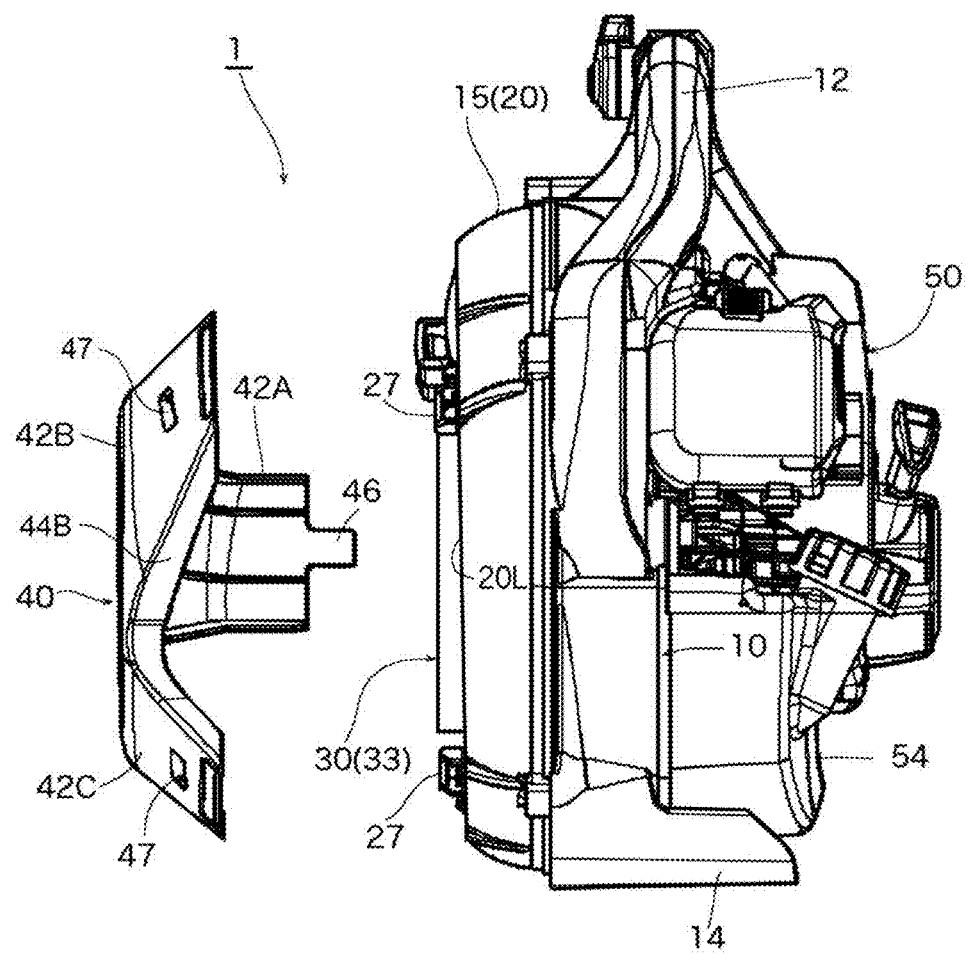
FIGS. 7A and 7B show the main portion of the portable power working machine shown in FIG. 1.
Figure 7B:
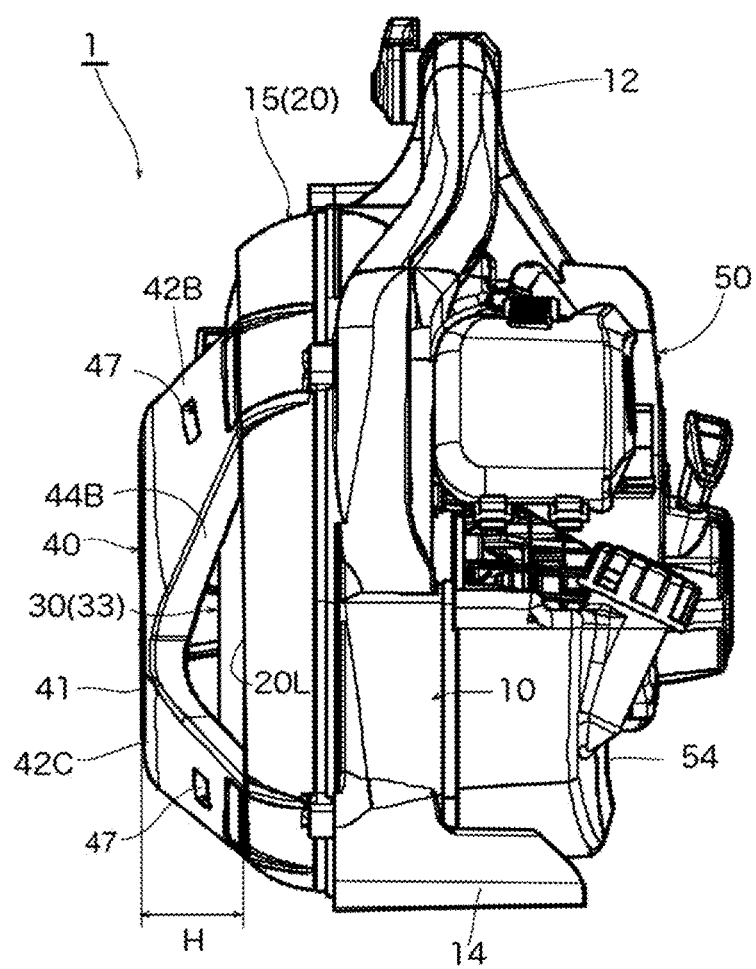

Furthermore, since the opening area of the lattice 43 portion of the top surface opening 45 and the opening areas of the peripheral surface openings 44A, 44B, and 44C of the block prevention guard 40 are set to be considerably large as described above, as shown in FIGS. 6B and 7B, the amount of the portion of the block prevention guard 40 that protrudes laterally from the one side surface portion 20L of the fan case 20 can be reduced as compared to the amount of the protruding portion of the safety guard 60 in the conventional example shown in FIG. 8B, thereby enabling a required air blowing performance to be obtained without causing an increase in size or weight, deterioration of the operability of the working machine, or the like.

In addition, the three longest main arc ribs 43a, 43b, and 43c of the lattice 43 portion provided in the top surface opening 45 are disposed so as to overlap the three longest main arc ribs 33a, 33b, and 33c of the lattice 33 portion of the safety guard 30, respectively, as seen in the left side view, and the three regions 43A, 43B, and 43C of the block prevention guard 40 are adapted to face directly the three regions 33A, 33B, and 33C of the safety guard 30, respectively, thereby enabling the inhaled air to be effectively regulated to improve the sucking efficiency.

It should be noted that in the working machine 1 of the aforementioned embodiment, the average opening area of the apertures of the lattice 43 provided in the top surface opening 45 of the block prevention guard 40 is set to be larger than that of the apertures of the lattice 33 of the safety guard 30. However, even when the average opening area of the apertures of the lattice 43 provided in the top surface opening 45 of the block prevention guard 40 is set to be equal to that of the apertures of the lattice 33 of the safety guard 30, it is possible to, as long as the total opening area of the block prevention guard 40 is designed to be larger than the opening area of the safety guard 30 (the lattice 33 portion thereof), prevent a reduction in the intake amount of air and thus suppress the fluctuation of the engine speed when the block prevention guard 40 is partially blocked by the clothing sucked thereto, and also weaken the force of sucking the clothing and thus suppress the operator's unpleasant feeling. As a result, the amplification of vibration and noise, the reduction in the amount of the blown air, the deterioration of the operability and the operation efficiency, and the like that were generated in the conventional example, can be suppressed.

It goes without saying that the shape and the like of the lattices 33 and 43 are not limited to those in the aforementioned embodiment, and there is no problem in adopting any patterns other than the geometric pattern. Further, in the aforementioned embodiment, the block prevention guard 40 has three leg portions, but as a matter of course, the block prevention guard 40 may have two, four, or more leg portions. Furthermore, the leg portions of the block prevention guard 40 may be omitted, and the block prevention guard that has the top surface opening with a curved surface, for example, may be provided so as to face the suction port 25.

Moreover, the aforementioned embodiment has described an example in which the present invention is applied to a hand-held air blowing cleaner (power blower). However, the present invention can be applied not only to a hand-held air blowing cleaner but also to a power sprayer that sprays chemicals or the like with the use of air (blown air) discharged from an air blower, and the like, and a portable power working machine of a shouldering strap type as well as a hand-held type.

What is claimed is:

1. A portable power working machine comprising:
   a casing having a side surface, the casing including inside thereof an air blower and a driving power source for rotationally driving a fan of the air blower, the fan having a rotational axis;
   a suction port provided in the side surface for intake air;
   a block prevention guard provided in the side surface of the casing to at least partially overlap the suction port, the block prevention guard comprising a top surface opening consisting of a plurality of first apertures shaped and arranged in a first predetermined geometric pattern, the block prevention guard further comprising a plurality of legs standing from the side surface of the casing to maintain the top surface opening at a distance from the side surface, wherein separately from the top surface opening, the plurality of legs form, between two adjacent legs, an air flow window extending in a circumferential direction of the top surface opening, and an opening area of each of the air flow windows is larger than an average opening area of the plurality of first apertures; and
   a safety guard attached to the side surface of the casing to overlap the suction port, the safety guard having a main opening consisting of a plurality of second apertures shaped and arranged in a second predetermined geometric pattern,
   wherein an average opening area of the first apertures is larger than an average opening area of the second apertures, and
   the first predetermined geometric pattern of the block prevention guard comprises a plurality of first main ribs extending across the top surface opening of the block prevention guard, and the second predetermined geometric pattern of the safety guard comprises a plurality of second main ribs extending across the main opening of the safety guard, the plurality of first and second and main ribs being provided in a same number and arranged in exact overlap with each other when viewed along the rotational axis.

2. The portable power working machine according to claim 1, wherein a sum of the total opening area of the plurality of first apertures in the top surface opening and the air flow windows is larger than a total opening area of the plurality of second apertures of the safety guard.

3. The portable power working machine according to claim 1, wherein each of the suction port and the top surface opening has a circular shape, and centers of the suction port and the top surface opening are aligned with the rotational axis of the fan.

4. The portable power working machine according to claim 1, wherein the first and second predetermined geometric patterns partially overlap with each other.

5. The portable power working machine according to claim 1, wherein the average opening area of the plurality of first apertures of the block prevention guard is three times or more larger than the average opening area of the plurality of second apertures of the safety guard.

6. The portable power working machine according to claim 2, wherein the sum of the total opening area of the plurality of first apertures and the air flow windows is twice or more larger than the total opening area of the plurality of second apertures of the safety guard.

* * * * *